United States Patent [19]

Zagorodnaya et al.

[11] 4,177,398
[45] Dec. 4, 1979

[54] SHROUD FOR MOUNTING ROTOR END WINDING IN ELECTRIC MACHINE

[76] Inventors: Galina A. Zagorodnaya, Altaiskaya ulitsa, 20, kv. 5; Gurgen P. Vartanian, Budapeshtskaya ulitsa, 15, korpus 2, kv. 29; Garri M. Khutoretsky, Altaiskaya ulitsa, 20, kv. 5; Vladimir M. Fridman, Grazhdansky prospekt, 13, korpus 1, kv. 170, all of Leningrad, U.S.S.R.

[21] Appl. No.: 771,826

[22] Filed: Feb. 24, 1977

Related U.S. Application Data

[63] Continuation of Ser. No. 595,217, Jul. 11, 1975, abandoned.

[51] Int. Cl.$^2$ .............................................. H02K 3/46
[52] U.S. Cl. .................................................... 310/270
[58] Field of Search ............... 310/270, 271, 194, 179, 310/214, 261, 42, 52, 54, 58, 61, 59, 64, 262, 264, 265

[56] References Cited

U.S. PATENT DOCUMENTS

| | | | |
|---|---|---|---|
| 2,960,360 | 11/1960 | Taylor | 310/270 |
| 3,189,769 | 6/1965 | Willyoung | 310/52 |

FOREIGN PATENT DOCUMENTS

| | | | |
|---|---|---|---|
| 1538754 | 3/1970 | Fed. Rep. of Germany | 310/270 |
| 1143595 | 2/1969 | United Kingdom | 310/270 |

*Primary Examiner*—R. Skudy
*Attorney, Agent, or Firm*—Haseltine, Lake & Waters

[57] ABSTRACT

An electric machine rotor end winding mounting shroud comprising a cylindrical shell having a thinned portion adjacent directly to the rotor body and provided with an inner annular recess at the edge region of the rotor body, whereby this cylindrical shell portion is made flexible, the cylindrical shell being cantilever-like arranged at the end portion of the rotor body.

4 Claims, 1 Drawing Figure

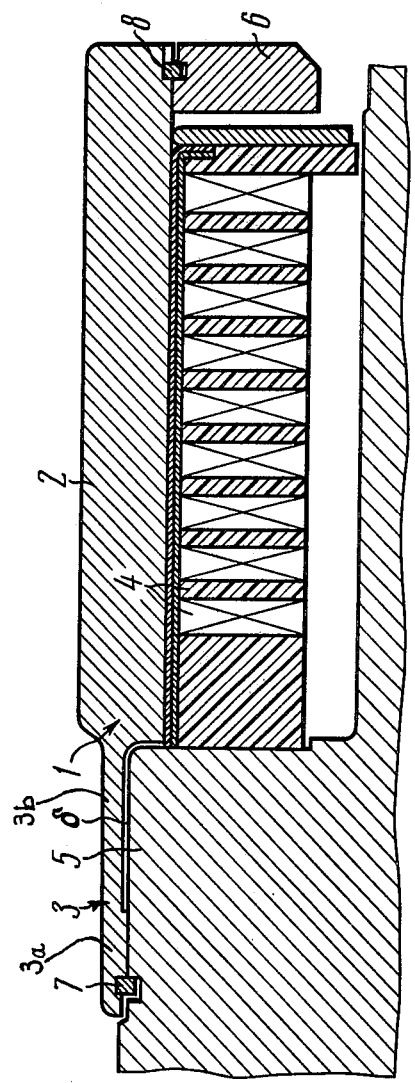

SHROUD FOR MOUNTING ROTOR END WINDING IN ELECTRIC MACHINE

The present application is a continuation of the parent application Ser. No. 595,217 filed July 11, 1975, now abandoned.

FIELD OF THE INVENTION

The present invention relates to electric machines, and, more particularly, to shrouds or bands for mounting rotor end winding in electric machines, such as turbogenerators.

PRIOR ART

It has been common practice to use seamless forged shrouds for mounting rotor end winding in electric machines, e.g. turbogenerators. Commonly, such a seamless forged shroud is a cylindrical shell having substantially constant wall thickness. One end of the shroud is fitted over the rotor body edge. The other end of the shroud has a centering ring arranged therein. The most widely used construction of the prior art shroud employs the so-called cantilever arrangement, i.e. the shroud has its one end mounted on the rotor body and the centering ring is not put on the rotor shaft, so there is a considerable gap between the centering ring inner surface and the rotor shaft.

The shroud is put on the centering ring and the rotor body with an interference shrinkage fit; the centering ring is coupled with the shroud prior to mounting the shroud assembly on the rotor. This step is not difficult from the technological point of view. However, mounting the shroud (together with the centering ring) on the rotor body is rather a complicated technological step. This is due to the fact that in order to ensure a reliable fit of the shroud over the rotor body with a sufficient degree of interference between the shroud and rotor body, the shroud should be heated to a high temperature. In the case of steel shrouds or bands of large-size turbogenerators this temperature may be as high as 180° to 230° C. When necessary, the removal of such shrouds is extremely troublesome, since in this case part of the heat will sink into the rotor body and centering ring.

A still higher heating temperature will be required for fitting and removal of titanium alloy shrouds or bands. Owing to their light weight and high strength, titanium alloys are nowadays looked at as preferable materials for rotor end winding shrouds and bands.

However, a titanium alloy has a modulus of elasticity which is approximately two times lower than that of steel, and because of this the titanium alloy shroud diameter increases to a greater extent during rotation as compared with the increase of the steel shroud diameter. Therefore, the interference between the titanium alloy shroud and the rotor body should be higher than in the case of steel shroud. Moreover, the coefficient of linear expansion of a titanium alloy is about two times lower than that of steel, and this, in turn, determines a higher heating temperature required for a titanium alloy shroud, as compared with steel shrouds at equal fitting interferences. As a result, the heating temperature may be as high as 500° C. in the case of titanium alloy shrouds, whereas for steel shrouds it lies in the range of only 180° to 230° C.

The high temperatures of heating titanium and even steel shrouds employed during mounting thereof on the rotor body and particularly during their removal, when necessary, not only require a special complicated technological step of heating, but, what is more important, are dangerous for the shroud insulation. This is a primary disadvantage restricting a wide use of the shrouds of light-weight titanium alloys.

In order to reduce the heating temperatures of titanium alloys composite shrouds or bands have been proposed, e.g. two-layer shrouds and shrouds having steel inserts.

In these prior art designs the reduction of the heating temperature is attained due to the thrust on the outer titanium part by the inner steel part. In this case some portion of titanium is removed and replaced by steel, i.e. the effect of using titanium as a lighter metal is reduced, if compared with the shroud made completely of titanium. Besides, although the steel thrust effect is utilized, the heating temperature is 1.3 to 1.4 times higher for composite shrouds than for steel ones.

SUMMARY OF THE INVENTION

The invention has as its object the provision of such a shroud for mounting a rotor end winding in an electric machine which will permit an easier process of mounting and a higher structural reliability.

It is an object of the present invention to provide a shroud for mounting a rotor end winding in an electric machine that will permit an easier process of mounting and a higher structural reliability.

The foregoing and other objects of the present invention are attained in an electric machine rotor end winding mounting shroud comprising a cylindrical shell embracing the rotor end winding and cantilever-like arranged at the end portion of the rotor body, wherein according to the invention said cylindrical shell is made with a thinned portion adjacent directly to the rotor body and provided with an inner annular recess whereby said cylindrical shell thinned portion is made flexible.

BRIEF DESCRIPTION OF THE DRAWING

The present invention will now be described in greater detail with reference to the accompanying drawing the sole FIGURE of which is an elevation view of a shroud for mounting a rotor end winding in an electric machine.

DETAILED DESCRIPTION

The shroud for mounting a rotor end winding in an electric machine comprises a cylindrical shell 1 having a thicked portion 2 and a thinned portion 3.

At the thicked shell portion 2 the shroud embraces an end rotor winding 4 and at the thinned shell portion 3 it embraces a rotor body 5. The shroud is arranged cantilever-like at the end portion of the rotor body and interference fitted over the rotor 5 and a centering ring 6. The shroud is put on the rotor body 5 at some distance from the edge of the body 5 in the vicinity of a first part 3a at the free end of the thinned shell portion 3 where the shell has a smaller diameter. At the remaining larger part 3b of the length of the thinned shell portion 3 an inner annular recess δ is provided between the portion 3 and the body 5 to make the part 3b of the thinned shell portion 3 somewhat felxible. The dimensions of the part 3b of the thinned portion 3 with the annular gap δ (radial thickness and axial length) are so selected that deformations of the thickened portion 2 caused by natural centrifugal forces and of the end winding are not transmitted to the shrink fit part 3a located adjacent to the free edge of the thinned portion. Thus, the thinned portion 3 with the annular gap (recess) δ is made sufficiently flexible to allow for resilient radial displacement of the thickened portion of the shroud ring relative to the rotor body 5. The shroud and the centering ring 6 are retained from the lateral displacement by slit keys 7 and 8. The reduction of the heating temperature employed during mounting the shroud on the rotor body 5, expecially at the insulation zone, is attained due to the following two reasons:

(1) At the thinned portion the shroud is not subject to the rotor winding centrifugal forces, since the winding is retained by the rotor wedges (not shown in the drawing) at this place. Therefore, the diameter increase caused by the rotation at the portion 2, particularly in the vicinity of its free end, is the result of the inherent centrifugal forces only. Owing to this, the required fitting interference is decreased by approximately 1.5 times in the case of steel shrouds and 2.5 times in the case of titanium alloy shrouds.

(2) When mounted over the rotor body 5, the shroud may be heated only at the thinned shell portion 3, thus reducing the heating of the thicked shell portion 2 and the shroud insulation.

It will be seen that during heating the shroud of the present invention, the temperature at the shorud insulation is not more than 100° C. and 150° C. in the case of steel and titanium alloy shrouds, respectively. Such temperatures are absolutely safe for the insulation. This is also almost true for the shroud removal.

What is claimed is:

1. A shroud for attachment to an electrical machine rotor having an end winding cantilevered to an end portion of the rotor comprising: a rotor body; said shroud including a cylindrical shell having two axial portions of different thickness, one being a thickened portion, the other a thinned portion, said thickened portion starting immediately from the end of the rotor body and embracing the end winding to secure the latter from centrifugal forces, said thinned portion embracing the rotor body and including a first part adapted for an interference fit over said body to secure the shroud in radial direction; said thinned portion including a second part providing an annular gap at the edge of said rotor body between said thinned portion and said rotor body, said first part of said thinned portion which is adapted for the interference fit over said rotor body being separated from the thickened-portion, said second part of said thinned portion which provides said annular gap allowing for resilient radial displacement of the thickened portion relative to said rotor body without substantial reduction of the interference fit.

2. The electric machine rotor as defined in claim 1 including a centering ring, said shroud being interference fitted over the rotor body and said centering ring, said shroud being located on said rotor body at a predetermined distance from the edge of the rotor body and in proximity of a free end of said thinned portion, said thinned portion having a substantially smaller diameter at the location of said shroud, the remaining larger part of the length of said thinned portion having an inner annular recess between said thinned portion and said rotor body for applying flexibility to said thinned portion and; slit key means for retaining said shroud and said centering ring from lateral displacement.

3. An electric machine rotor as defined in claim 2 wherein the ratio of the radial thickness to the length of the thinned portion free of fit as measured from the location of fit on the rotor body to the thickened portion is selected such as to relieve the outer fit end of the flexible portion from centrifugal forces developed at the end part of the winding.

4. An electric machine rotor as defined in claim 1 wherein said first part of the thinned portion has a lesser axial extent compared to said second part of the thinned portion.

* * * * *